(12) United States Patent
Takada

(10) Patent No.: US 11,467,253 B2
(45) Date of Patent: Oct. 11, 2022

(54) RADAR DEVICE AND TARGET DETECTION METHOD

(71) Applicant: Yuji Takada, Tokyo (JP)

(72) Inventor: Yuji Takada, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 259 days.

(21) Appl. No.: 16/640,752

(22) PCT Filed: Sep. 20, 2018

(86) PCT No.: PCT/JP2018/034783
§ 371 (c)(1),
(2) Date: Feb. 21, 2020

(87) PCT Pub. No.: WO2019/065439
PCT Pub. Date: Apr. 4, 2019

(65) Prior Publication Data
US 2021/0132191 A1 May 6, 2021

(30) Foreign Application Priority Data

Sep. 29, 2017 (JP) .............................. JP2017-191207

(51) Int. Cl.
*G01S 7/41* (2006.01)
*G01S 13/931* (2020.01)
(52) U.S. Cl.
CPC ............ *G01S 7/415* (2013.01); *G01S 13/931* (2013.01)
(58) Field of Classification Search
CPC ................................ G01S 7/415; G01S 13/931
See application file for complete search history.

(56) References Cited

U.S. PATENT DOCUMENTS

2012/0293357 A1 11/2012 Nishigaki
2016/0011299 A1 1/2016 Satou et al.
2016/0291145 A1* 10/2016 Zeng ..................... G01S 13/867

FOREIGN PATENT DOCUMENTS

DE 102012021461 A1 5/2013
DE 102011121560 A1 6/2013
(Continued)

OTHER PUBLICATIONS

Extended European Search Report dated May 19, 2021.
International Search Report from International Application No. PCT/JP2018/034783 dated Dec. 11, 2018.

*Primary Examiner* — Vladimir Magloire
*Assistant Examiner* — Artem Melkunov
(74) *Attorney, Agent, or Firm* — Brundidge & Stanger, P.C.

(57) ABSTRACT

This radar device can recognize the type of a specific target (in particular, a two-wheeled vehicle) with high precision, using only the radar device. The radar device comprises: a transmission unit that transmits a transmission wave, based on a transmission signal, toward the target; a receiving unit that receives a reflected wave generated by the transmission wave being reflected by the target, and thereby generates a reception signal; and a target detection unit that acquires information on the target on the basis of the transmission signal and the reception signal. The target detection unit calculates the relative speeds of a plurality of detection points within the same target, and determines the type of the target on the basis of the spread of the relative speeds.

4 Claims, 8 Drawing Sheets

(56) References Cited

FOREIGN PATENT DOCUMENTS

| | | |
|---|---|---|
| JP | 05-027018 A | 2/1993 |
| JP | 2007-139650 A | 6/2007 |
| JP | 2009-211212 A | 9/2009 |
| JP | 4992367 B2 | 8/2012 |
| JP | 5098675 B2 * | 12/2012 |
| JP | 2014-153256 A | 8/2014 |
| JP | 5959581 A | 11/2014 |

* cited by examiner

RADAR DEVICE AND TARGET DETECTION METHOD

TECHNICAL FIELD

The present invention relates to a radar apparatus and a target detection method for detecting a target in the periphery, and more particularly, to a technique of recognizing the type of a specific target.

BACKGROUND ART

Intelligent Transport Systems (ITS) for solving problems related to road traffic using information and communication technology are being developed. In this field, techniques for detecting a surrounding environment (such as a vehicle, a pedestrian, an obstacle in the periphery) of a vehicle by a sensor, and for performing a safety support operation (for example, alert, brake control or the like) for avoiding or reducing a risk on the basis of a detection result have been put to practical use, for example.

As one such sensor, there is known a radar apparatus (a so-called millimeter wave radar) that uses millimeter waves having wavelengths of 1 to 10 mm (frequencies: 30 to 300 GHz). Since a millimeter wave radar uses radio waves, a certain level of sensitivity can advantageously be maintained even in bad weather such as rain or fog. In recent years, a high-resolution millimeter wave radar that uses millimeter waves in a wide band of 79 GHz band (77 to 81 GHz) has been put to practical use.

A frequency modulated-continuous wave (FMCW) method is widely used by vehicle-mounted radar apparatuses. According to the FMCW method, a continuous frequency-modulated wave (millimeter wave) is transmitted, and a reflected wave that is reflected from a target object (hereinafter referred to as "target") is received. The position (distance and azimuth) or the relative velocity of the target is then detected on the basis of a frequency difference between transmission/reception signals.

Furthermore, information obtained by the radar apparatus can be used to determine a still object, detect an attachment angle of the radar apparatus, detect a movement direction of a target (such as a preceding vehicle) or determine the type of the target (for example, Patent Literatures (hereinafter, abbreviated as PTLs) 1 to 5). PTL 5 discloses identification of a two-wheeler using an image taken by a camera and information obtained by the radar apparatus.

CITATION LIST

Patent Literature

PTL 1
Japanese Patent No. 4992367
PTL 2
Japanese Patent Application Laid-Open No. 2014-153256
PTL 3
Japanese Patent Application Laid-Open No. 2009-211212
PTL 4
Japanese Patent Application Laid-Open No. 2007-139650
PTL 5
Japanese Patent No. 5959581

SUMMARY OF INVENTION

Technical Problem

However, because it is difficult to highly accurately recognize the type of a target only by the radar apparatus, identification of a two-wheeler by a conventional method is premised on use of an image taken by a camera.

An object of the present invention is to provide a radar apparatus and a target detection method by which the type of a specific target (particularly, a two-wheeler) can be highly accurately recognized by the radar apparatus alone.

Solution to Problem

A radar apparatus according to one aspect of the present invention includes:
a transmitting section that transmits a transmission wave that is based on a transmission signal toward a target;
a receiving section that receives a reflected wave generated when the transmission wave is reflected on the target, and generates a reception signal; and
a target detecting section that acquires information about the target on a basis of the transmission signal and the reception signal, in which:
the target detection section calculates relative velocities of a plurality of detected points on a same target, and
the target detection section determines a type of the target on a basis of spread of the relative velocities.

A target detection method according to one aspect of the present invention is a method of detecting a target using a radar apparatus, the target detection method including:
a first step of transmitting a transmission wave that is based on a transmission signal toward a target;
a second step of receiving a reflected wave generated when the transmission wave is reflected on the target, and generating a reception signal; and
a third step of acquiring information about the target on a basis of the transmission signal and the reception signal, in which
in the third step:
relative velocities of a plurality of detected points on a same target are calculated, and
a type of the target is determined on a basis of spread of the relative velocities.

Advantageous Effects of Invention

According to the present invention, the type of a specific target may be highly accurately recognized by the radar apparatus alone.

DESCRIPTION OF EMBODIMENTS

Hereinafter, an embodiment of the present invention will be described in detail with reference to the accompanying drawings. In the present embodiment, a vehicle-mounted radar apparatus that is mounted on a vehicle is described as an example of a radar apparatus according to the present invention.

Figure 1:
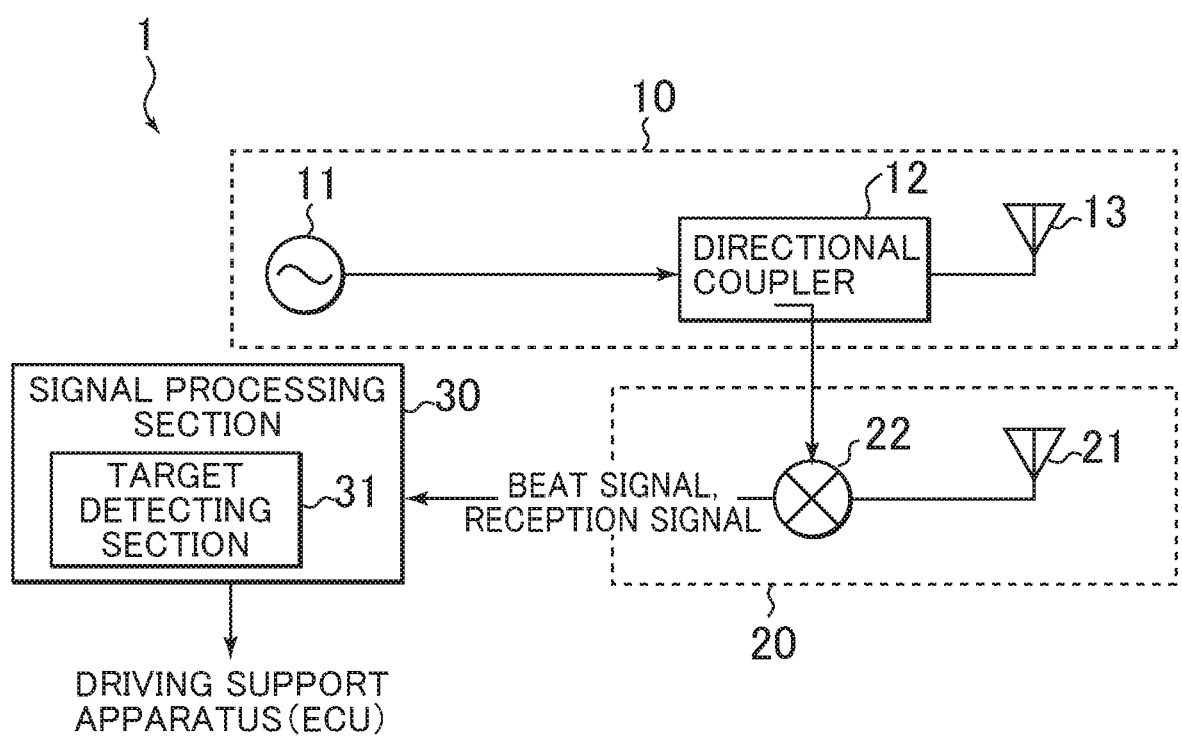
FIG. 1 is a diagram illustrating a configuration of a radar apparatus according to an embodiment of the present invention.

FIG. 1 is a diagram illustrating a configuration of radar apparatus 1 according to an embodiment of the present invention.

For example, radar apparatus 1 is a millimeter wave radar according to the FMCW method that uses millimeter waves in a 79 GHz band. For example, radar apparatus 1 is disposed on a front bumper or a rear bumper of a vehicle.

For example, radar apparatus 1 detects a surrounding environment (such as a vehicle, a pedestrian, an obstacle in the periphery) of a vehicle, and outputs information about the surrounding environment to an electronic control unit (ECU) of the vehicle. For example, the ECU performs a driving support operation for avoiding or reducing a risk on the basis of the information about the surrounding environment output from radar apparatus 1. The information about the surrounding environment includes the position (distance and azimuth) and relative velocity of a target.

As illustrated in FIG. 1, radar apparatus 1 includes transmitting section 10, receiving section 20, signal processing section 30 and the like. A one-chip IC on which transmitting section 10, receiving section 20 and signal processing section 30 are disposed on one substrate may be adopted as radar apparatus 1.

Transmitting section 10 includes signal source 11, directional coupler 12 and transmission antenna 13. Transmitting section 10 transmits a transmission wave that is based on a transmission signal toward a target.

Signal source 11 generates a transmission signal that is frequency-modulated (FM: frequency modulation), by adding a triangle-wave modulation signal to a control voltage of a voltage controlled oscillator (VCO).

Directional coupler 12 outputs the transmission signal to transmission antenna 13, and also, distributes a part of the transmission signal to mixer 22.

Transmission antenna 13 radiates the transmission signal to the surroundings of the vehicle as a transmission wave. When the transmission wave reaches a target, it is reflected according to reflectivity of the target.

Receiving section 20 includes reception antenna 21 and mixer 22. Receiving section 20 receives a reflected wave generated once the transmission wave is reflected on the target to generate a reception signal.

Reception antenna 21 receives the reflected wave reflected by the target, and outputs the same as a reception signal.

Mixer 22 mixes the reception signal output from reception antenna 21 and the transmission signal output from directional coupler 12, and generates a beat signal. Mixer 22 outputs the reception signal and the beat signal to signal processing section 30.

Signal processing section 30 includes target detecting section 31. Target detecting section 31 detects information about a target by performing frequency analysis by executing a process such as fast Fourier transform (FFT) on the reception signal and the beat signal. For example, target detecting section 31 is capable of detecting presence of a target on the basis of frequency distributions of the reception signal and the beat signal, and of detecting the position (distance and azimuth) and the relative velocity of the detected target. Information about the target detected by target detecting section 31 is output to the ECU of the vehicle that functions as a driving support apparatus, for example, via an external interface (not illustrated).

In recent years, the resolution of radar apparatuses is being increased, allowing features of a plurality of detected points on a same target to be individually detected. In the present embodiment, radar apparatus 1 has range resolution and azimuth resolution by which, in the case of detection of a target such as a vehicle (including bicycles), a plurality of detected points are included on the same target.

Figure 2:
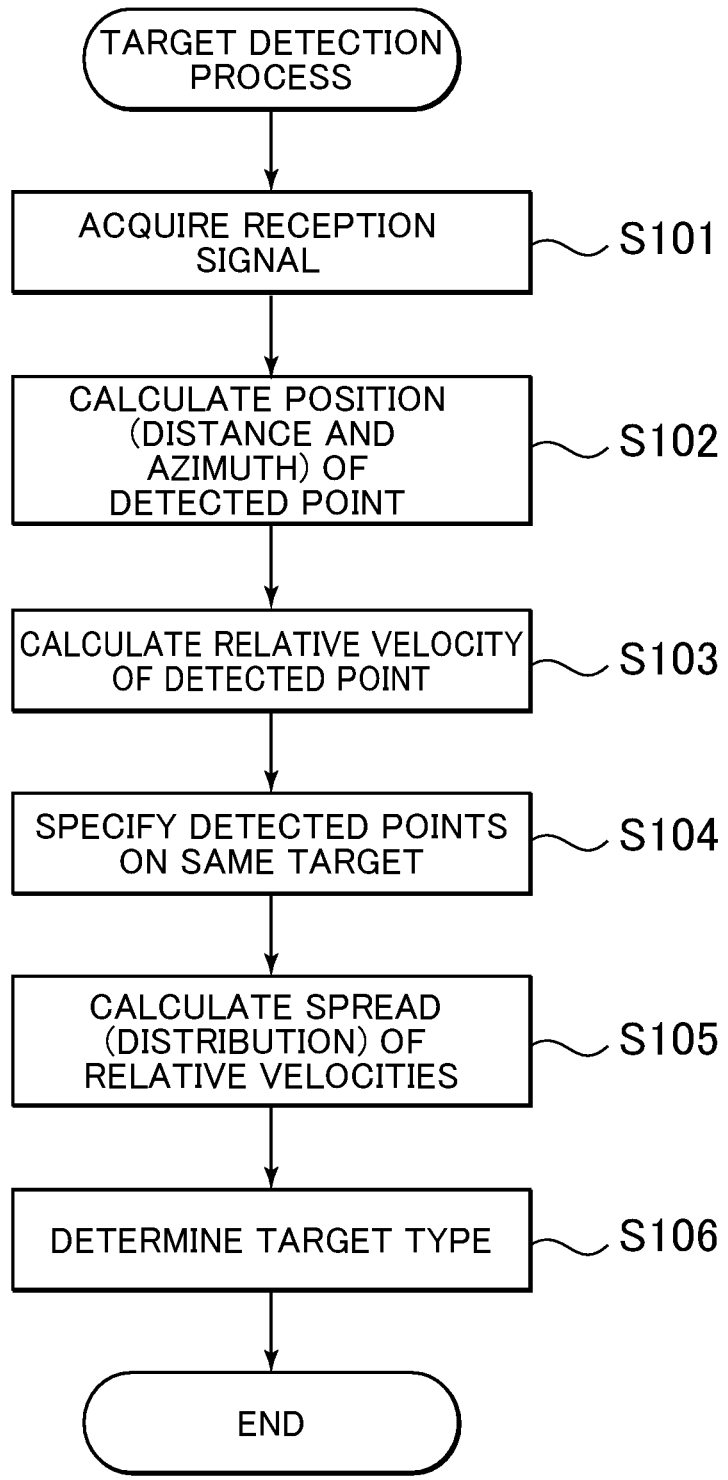
FIG. 2 is a flowchart illustrating an example of a target detection process by a signal processing section.

FIG. 2 is a flowchart illustrating an example of a target detection process by signal processing section 30 (target detecting section 31). For example, the target detection process illustrated in FIG. 2 is started when power of radar apparatus 1 is turned on, and a predetermined target detection program is executed by a CPU of signal processing section 30.

Figure 3:
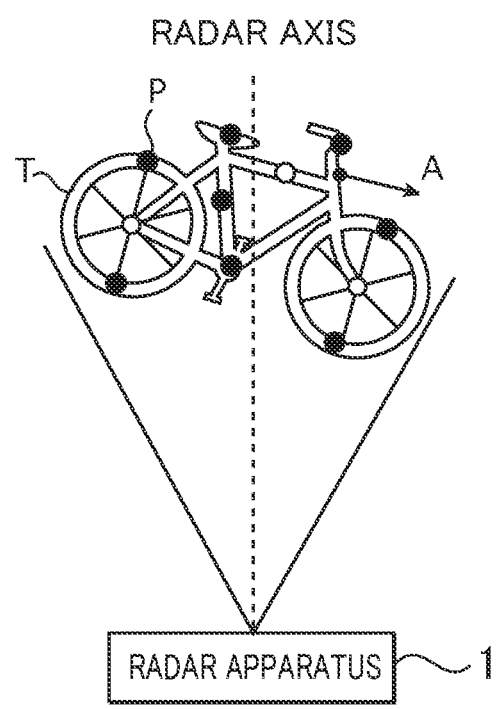
FIG. 3 is a diagram illustrating detected points on a target.

Here, as illustrated in FIG. 3, a case of determining the type of target T moving at relative velocity A, or more specifically, a case of determining whether target T is a two-wheeler or not, will be described. As illustrated in FIG. 3, in the case where target T such as a vehicle is present in an observation range of radar apparatus 1, features are detected for a plurality of detected points P. Furthermore, in the case where target T is a two-wheeler, a rotational body that generates a velocity component is within the target, and thus, observed relative velocities are different among the detected points on the target. In the present embodiment, whether target T is a two-wheeler or not is determined using the difference between the relative velocities of the detected points (hereinafter referred to as "spread of relative velocities").

In step S101 in FIG. 2, signal processing section 30 (target detecting section 31) receives a reception signal and a beat signal output from receiving section 20.

In step S102, signal processing section 30 calculates the position (distance and azimuth) of detected point P. The distance and the azimuth of detected point P may be determined by performing frequency analysis on the beat signal and the reception signal.

In step S103, signal processing section 30 calculates the relative velocity for each detected point P. Additionally, a known method of a conventional radar apparatus may be used for calculation of the position and the relative velocity of detected point P in step S102 and step S103, and thus, a detailed description thereof is omitted.

In step S104, signal processing section 30 identifies detected points P on a same target. For example, a group of detected points P, features of which are within a predetermined range, may be assumed to be detected points on a same target. Additionally, features of detected point P are a concept including the position and the relative velocity of detected point P.

In step S105, signal processing section 30 calculates the spread (distribution) of the relative velocities on the basis of the features of detected points P.

Figure 4:
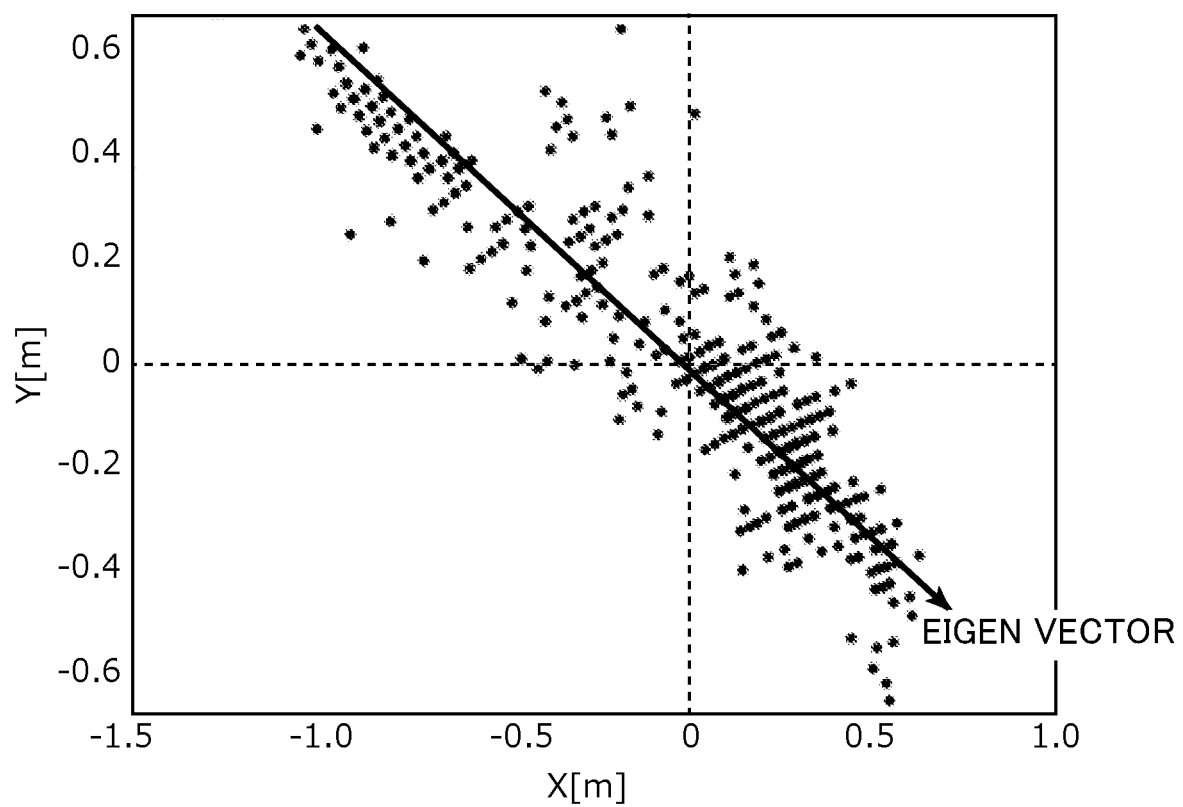
FIG. 4 is a diagram illustrating positions of the detected points.

Specifically, detected points P on a same target are clustered on the basis of the features (positions) of detected points P, and are plotted on XY-coordinates (see FIG. 4). In FIG. 4, an eigen vector of target T is calculated, and an inclination of the cluster is determined. Furthermore, all the points are rotated such that the inclination of the cluster becomes zero (see FIG. 5). After rotation, an X-direction indicates a vehicle length of target T, and a Y-direction indicates a vehicle width of target T.

Figure 5:
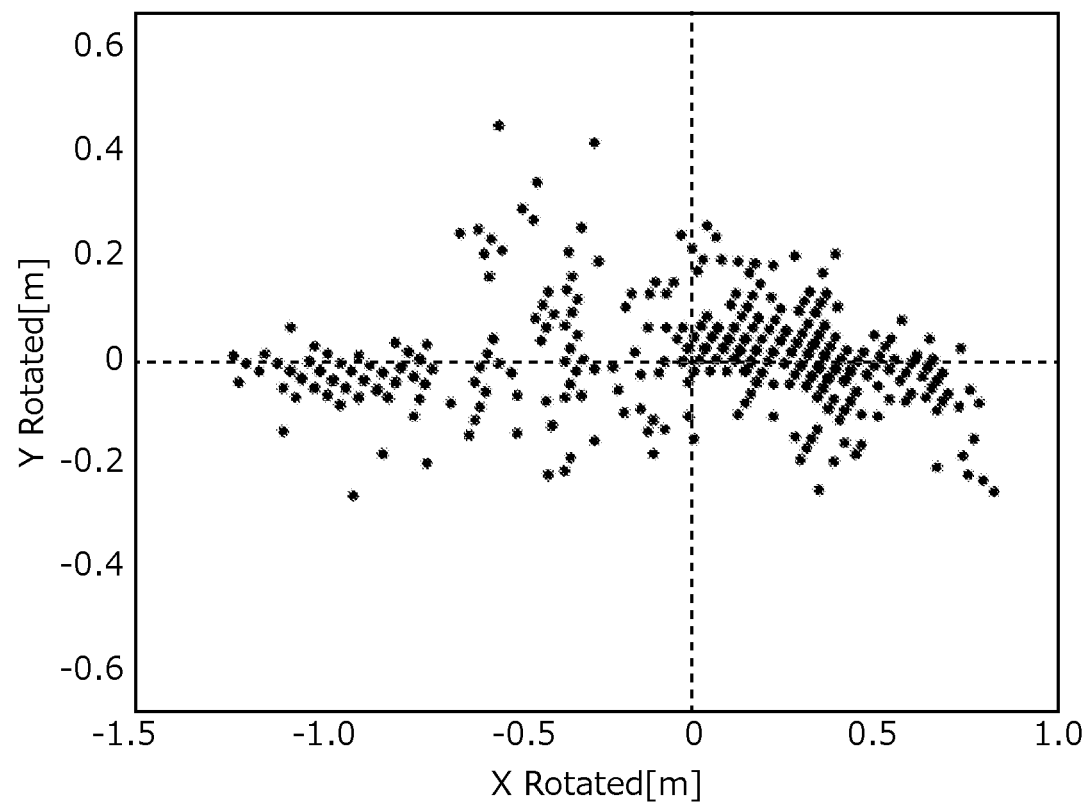
FIG. 5 is a diagram illustrating positions of the detected points that are corrected on the basis of velocity vectors.
Figure 6:
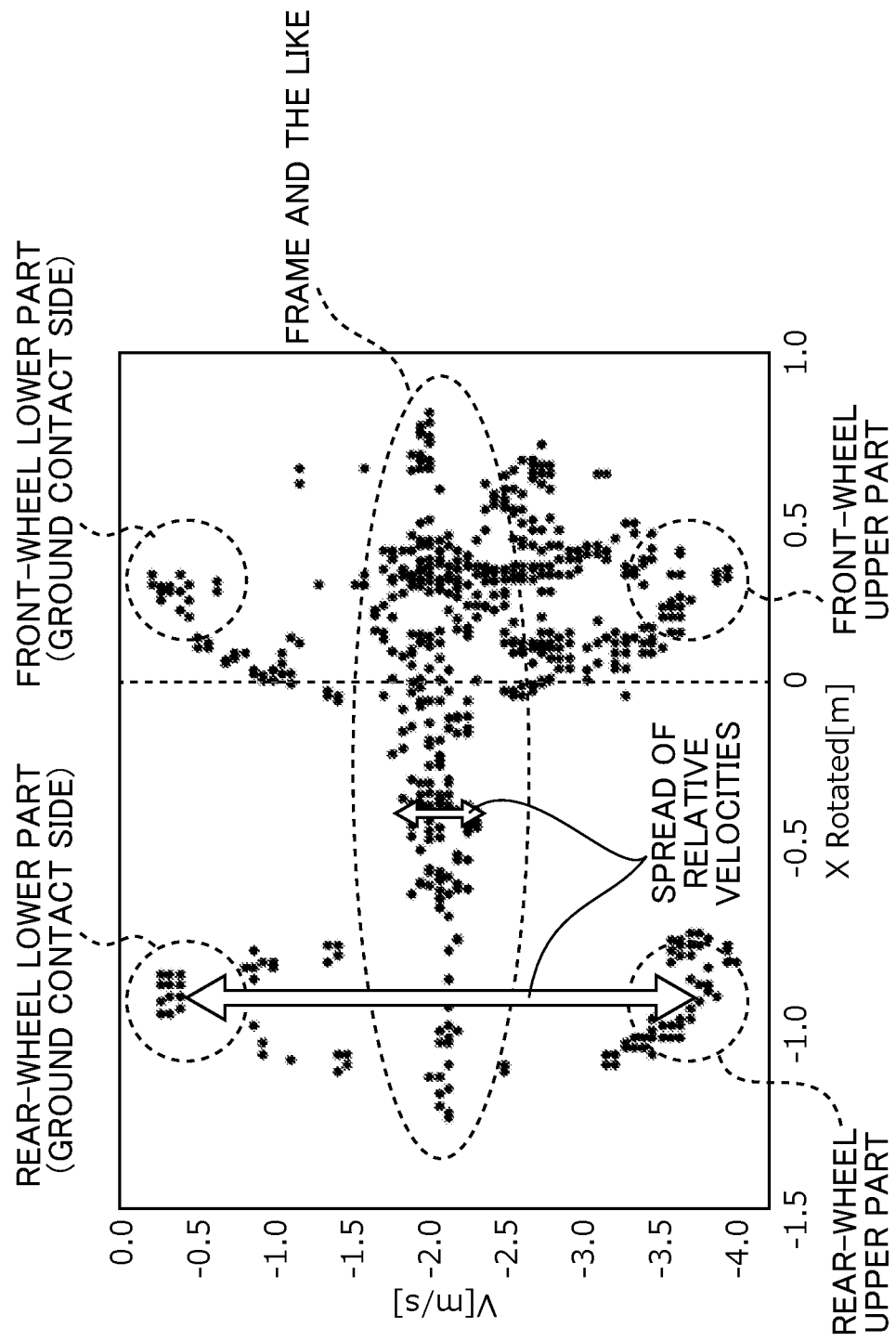
FIG. 6 is a diagram illustrating relative velocities of the detected points.
Figure 7:
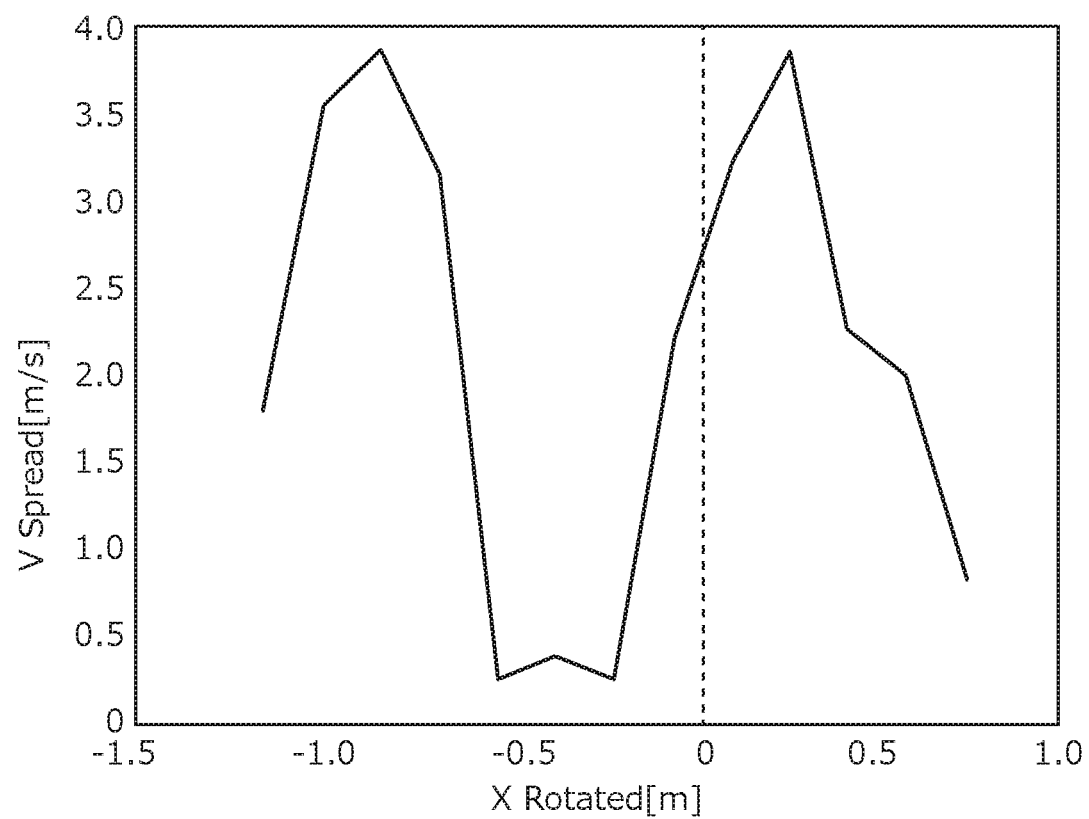
FIG. 7 is a diagram illustrating a spread (distribution) of the relative velocities.

Next, plotting is performed taking a horizontal axis as the X-coordinate after rotation, and a vertical axis as the relative velocity of detected point P (see FIG. 6). Then, the horizontal-axis direction is divided into a plurality of sections, and the spread of relative velocities in each section is determined. In the case where features as illustrated in FIG. 5 are obtained by radar apparatus 1, the shape of the spread of relative velocities takes a shape as illustrated in FIG. 7.

In step S106 in FIG. 2, signal processing section 30 determines the type of target T. Specifically, the type of target T is determined by comparing the shape of the spread of relative velocities obtained in step S105 with a reference shape for the spread of relative velocities prepared in advance according to the type of target T.

Figure 8:
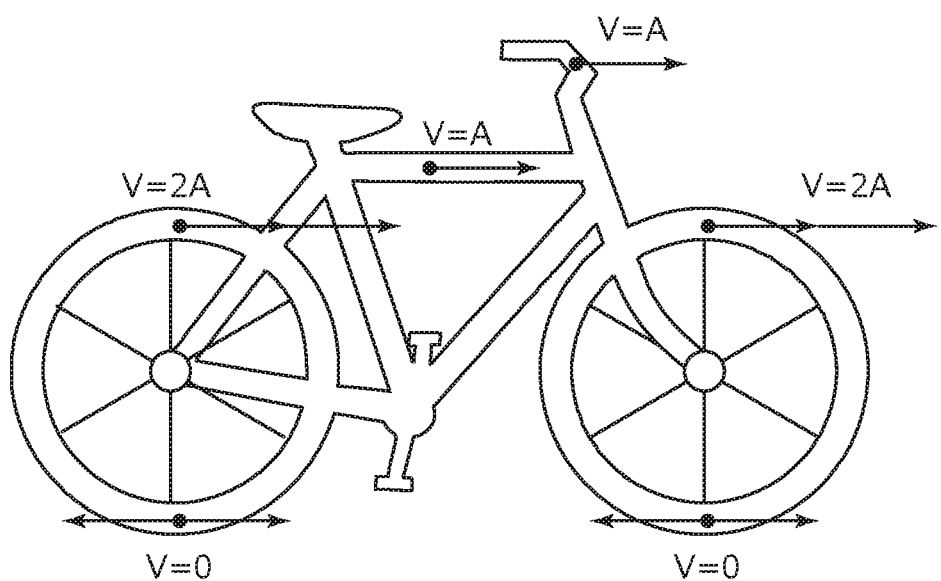
FIG. 8 is a diagram illustrating relative velocities of detected points on a two-wheeler.

As illustrated in FIG. 8, in the case where target T is a two-wheeler, the relative velocity of the detected points at upper parts of front and rear wheels is, in theory, twice the relative velocity of target T, due to rotation of the front and rear wheels. On the other hand, the relative velocity of the detected points at lower parts (ground contact points) of the front and rear wheels is, in theory, zero. Furthermore, the relative velocity of the detected points at parts other than the front and rear wheels, such as a frame, is the same as the relative velocity of target T. Accordingly, in the vehicle length direction, the spread of relative velocities is great at positions corresponding to the front and rear wheels, and the spread of relative velocities is small at positions other than the front and rear wheels, such as the frame (see FIG. 6).

Accordingly, by referring to a reference shape having peaks at the positions corresponding to the front and rear wheels in the vehicle length direction, whether target T is a two-wheeler or not may be determined. A plurality of reference shapes may be prepared according to sizes and types of the two-wheeler. In this case, an optimum reference shape may be selected by estimating features (wheel diameter, wheel gap and the like) of the target from a shape obtained by plotting the detected points on a two-dimensional plane.

As described above, radar apparatus 1 includes transmitting section 10 that transmits a transmission wave that is based on a transmission signal toward target T, receiving section 20 that receives a reflected wave generated once the transmission wave is reflected on the target T to generate a reception signal, and target detecting section 31 (signal processing section 30) that acquires information about target T on the basis of the transmission signal and the reception signal. Target detecting section 31 calculates the relative velocities of a plurality of detected points P on a same target, and determines the type of the target on the basis of the spread of relative velocities.

Furthermore, the target detection method of radar apparatus 1 includes a first step of transmitting a transmission wave that is based on a transmission signal toward target T, a second step of receiving a reflected wave generated once the transmission wave is reflected on the target T to generate a reception signal, and a third step of acquiring information about target T on the basis of the transmission signal and the reception signal. In the third step, relative velocities of a plurality of detected points P on a same target are calculated, and the type of the target is determined on the basis of spread of the relative velocities.

With radar apparatus 1, the type of specific target T, or more specifically, whether target T is a two-wheeler or not, may be highly accurately recognized by radar apparatus 1 alone.

For example, the type of target T obtained by radar apparatus 1 is output together with the position and the relative velocity of target T, to the driving support apparatus (ECU) of the vehicle, as information about the surrounding environment. The driving support apparatus performs a driving support operation for avoiding or reducing a risk on the basis of the information about the surrounding environment.

The driving support operation here includes an operation of automatically decelerating or stopping the vehicle by controlling a brake operation of the vehicle, an operation of automatically changing a traveling direction of the vehicle by controlling a steering operation, and an operation of issuing an alert to an occupant or to outside (an alert based on audio and/or information display).

The driving support operation of the vehicle is performed on the basis of the information about the surrounding environment. This significantly increases safety of other vehicles and pedestrians, not to mention the safety of the vehicle in question. In the present embodiment, the fact that a two-wheeler is traveling in the periphery of the vehicle can be grasped, and the driver of the vehicle may be alerted, for example.

Heretofore, the invention made by the present inventor has been specifically described using an embodiment, but the present invention is not limited to the embodiment described above, and modifications may be made within the scope of the present invention.

For example, the type of a target is desirably determined taking into account not only the spread of relative velocities, but also the features of target T (such as a wheel gap of a two-wheeler) estimated from the shape of the spread of relative velocities and the features of target T (such as the relative velocity) detected by radar apparatus 1. This increases the accuracy of determination of the type of target T, allowing a bicycle and a motorcycle to be distinguished from each other.

Moreover, whereas a bicycle has pedals disposed between front and rear wheels, and a velocity component is generated at the parts by rotation of the pedals, a motorcycle does not include the pedals. Accordingly, a bicycle and a motorcycle can be distinguished from each other if a reference shape for the spread of relative velocities for a bicycle and a reference shape for a motorcycle are made different from each other. Specifically, the reference shape for a bicycle has a peak corresponding to the pedal, between peaks corresponding to the front and rear wheels.

Furthermore, for example, radar apparatus 1 may use a method other than the FMCW method, such as a pulse method or frequency shift keying (FSK).

Furthermore, radar apparatus 1 according to the present invention may be mounted not only on a vehicle, but also on transportation equipment such as a railroad vehicle, a vessel or an aircraft, or on a roadside unit that is installed on a road. Sensors such as other radar apparatuses (such as a 76 GHz millimeter wave radar) and stereo cameras may be mounted in combination on the transportation equipment. The surrounding environment of the transportation equipment may be more accurately grasped by mounting a plurality of sensors.

Moreover, the process of determining the type of target T executed by target detecting section 31 (steps S105 and S106 in FIG. 2) may be implemented by causing the ECU of the vehicle to execute the target detection program. That is, the target detection method of the present invention may be applied not only to the radar apparatus, but also to an external apparatus, such as the ECU, that uses an output from the radar apparatus. In such a case, an already installed radar apparatus may be effectively used.

The embodiment disclosed herein is illustrative in every aspect, and should be understood to be non-restrictive. The scope of the present invention is indicated not by the description given above but by the scope of the claims, and is intended to include all the modifications within the scope and meaning equivalent to those of the scope of the claims.

The disclosure of Japanese Patent Application No. 2017-191207, filed on Sep. 29, 2017, including the specification, drawings and abstract, is incorporated herein by reference in its entirety.

REFERENCE SIGNS LIST

1 Radar apparatus
10 Transmitting section
11 Signal source
12 Directional coupler
13 Transmission antenna
20 Receiving section
21 Reception antenna
22 Mixer
30 Signal processing section
31 Target detecting section

What is claimed is:

1. A radar apparatus, comprising:
a transmitting section that transmits a transmission wave that is based on a transmission signal toward a target;
a receiving section that receives a reflected wave generated when the transmission wave is reflected on the target, and generates a reception signal; and
a target detecting section that acquires information about the target on a basis of the transmission signal and the reception signal, wherein:
the target detection section calculates relative velocities of a plurality of detected points on a same target, and
the target detecting section determines the type of the target by comparing a reference shape for the spread of the relative velocities with a shape of the spread of the relative velocities calculated, the reference shape being prepared in advance according to the type of the target.

2. The radar apparatus according to claim 1, wherein:
the reference shape has a shape including peaks at positions corresponding to front and rear wheels in a vehicle length direction, and
the target detecting section determines whether the target is a two-wheeler or not.

3. A target detection method of detecting a target using a radar apparatus, the target detection method comprising:
a first step of transmitting a transmission wave that is based on a transmission signal toward a target;
a second step of receiving a reflected wave generated when the transmission wave is reflected on the target, and generating a reception signal; and
a third step of acquiring information about the target on a basis of the transmission signal and the reception signal, wherein
in the third step:
relative velocities of a plurality of detected points on a same target are calculated, and
a type of the target is determined by comparing a reference shape for the spread of the relative velocities with a shape of the spread of the relative velocities calculated, the reference shape being prepared in advance according to the type of the target.

4. The target detection method according to claim 3, wherein:
the reference shape has a shape including peaks at positions corresponding to front and rear wheels in a vehicle length direction, and
in the third step, whether the target is a two-wheeler or not is determined.

* * * * *